June 28, 1960     F. K. H. NALLINGER     2,942,893
SWINGING HALF-AXLE SUSPENSION OF VEHICLES
Filed May 31, 1955     3 Sheets-Sheet 1
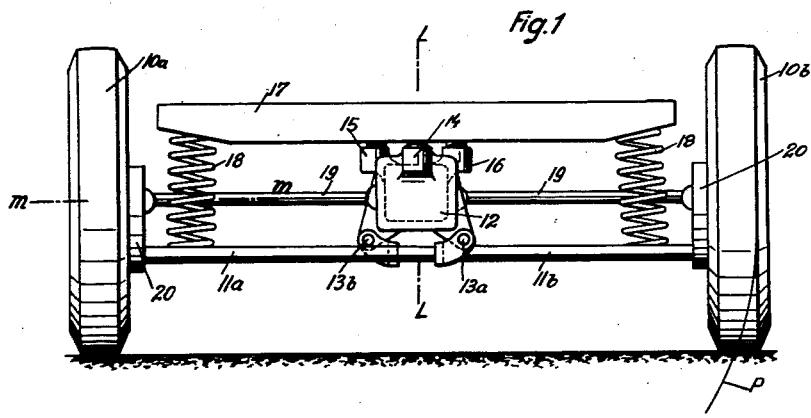
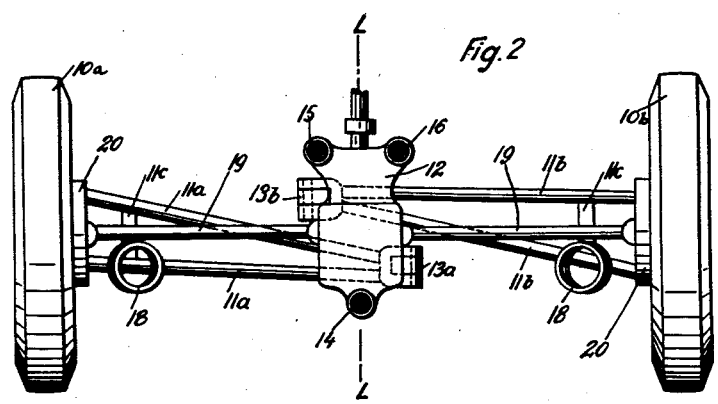
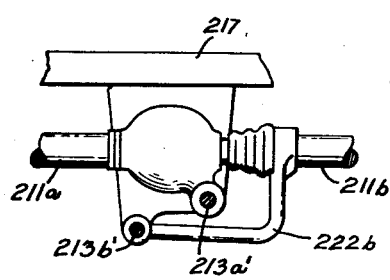
Inventor
FRIEDRICH K. H. NALLINGER
BY Dicke and Craig
ATTORNEYS.

June 28, 1960     F. K. H. NALLINGER     2,942,893
SWINGING HALF-AXLE SUSPENSION OF VEHICLES
Filed May 31, 1955     3 Sheets-Sheet 3

Inventor
FRIEDRICH K.H. NALLINGER
BY Dicke and Craig
ATTORNEYS.

United States Patent Office 2,942,893
Patented June 28, 1960

2,942,893

SWINGING HALF-AXLE SUSPENSION OF VEHICLES

Friedrich K. H. Nallinger, Stuttgart, Germany, assignor to Daimler-Benz Aktiengesellschaft, Stuttgart-Unterturkheim, Germany Filed May 31, 1955, Ser. No. 512,027

Claims priority, application Germany May 31, 1954

6 Claims. (Cl. 280—124)

My invention relates to the swinging half-axle suspension of vehicles, more particularly to the suspension of the driven wheels of a vehicle by swinging half axles.

Wheel suspensions of this kind have the advantage over a suspension guiding the wheels parallel to each other in that they ensure greater stability of the body and reduce banking in curves. Also the suspension of driven wheels by swinging half axles results in a highly desirable reduction of the numerous universal joints in the driving connections.

In prior suspensions of this character, however, the advantages just explained are offset to a large extent by the disadvantage of a considerable variation of the tread distance of the wheels coincidental to a relative up-and-down movement of the wheels and the body of the vehicle, such variation of the tread distance being liable to induce skidding or swerving of the vehicle. Another disadvantage is the tendency of the swinging half axles to directly transfer lateral shocks acting on the wheels to the body without any absorption or cushioning effect.

It is the object of the present invention to so modify the prior wheel suspensions based on the half axle principle as to retain the advantages described hereinabove while eliminating the disadvantages just explained. More particularly, it is an object of my invention to provide an improved wheel suspension in which each of the carriers of opposite wheels is rigidly connected with an arm or strut pivotally connected by a hinge to a supporting part of the body, the hinges being so disposed with respect to the wheels and the axes thereof that the movement of each wheel relative to the body will be an arcuate path of a large radius which approaches an upright path as nearly as possible.

As a result, the variation of the tread distance coincidental to an up-and-down movement of the body relative to the wheels will be reduced to a minimum. Also, any shocks or thrusts acting on the wheels transversely to the direction of travel will be absorbed or cushioned to a much larger extent than heretofore possible.

Further objects of my invention will appear from a detailed description following hereinafter of a number of preferred embodiments of my invention. I wish to emphasize, however, that such detailed description serves the purpose of illustrating the invention rather than that of defining the same in a restrictive manner. The features of novelty for which protection is desired will be pointed out in the claims. In the drawings:

Fig. 1 is a rear elevation of a vehicle showing the suspension of a pair of driven wheels, Fig. 2 is a plan view of Fig. 1, the vehicle body being omitted.

Fig. 11 is a modification of Fig. 5.

Figure 3:
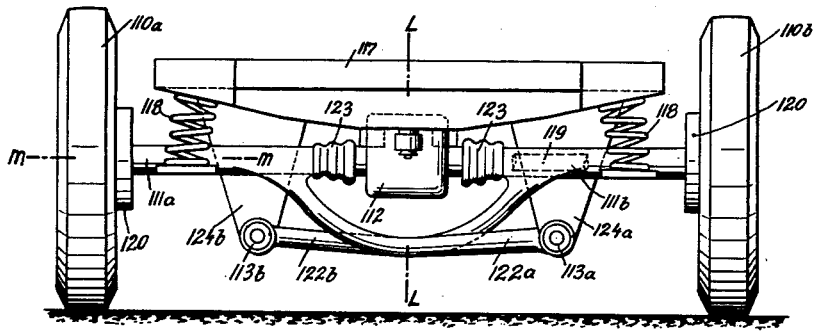
Fig. 3 is a view similar to that of Fig. 1 of a modified wheel suspension.

In the vehicle shown in Figs. 1 and 2 the body 17 includes a supporting part 12 which will be described later, a pair of opposite wheels 10a and 10b journalled on wheel carriers 20 to which arms or struts 11a and 11b are rigidly secured. The ends of the arms are pivotally connected to the supporting part 12 by hinges 13a, and 13b respectively.

For the purpose of the present invention each of the hinges 13a and 13b is disposed beneath and spaced from the axis $m$—$m$ of its associated wheels 10a and 10b, respectively. Moreover, hinge 13a associated to wheel 10a is disposed between the opposite wheel 10b and the longitudinal central plane L—L of the vehicle and hinge 13b is disposed between wheel 10a and L—L. Up-and-down motion of the wheel relative to the body 17 will cause the road-contacting zone of the wheel 10b to travel along in an arcuate path P which is the arc of a circle drawn about hinge 13b. Similarly, the road-contacting zone of wheel 10a will travel along an arc drawn about the hinge 13a. These arcuate paths approach vertical lines much more closely than in prior suspensions where the hinge is intersected by the axes $m$—$m$ and is located within the plane L—L or even closer to the respective wheel.

Preferably, the supporting part 12 of the body is connected with the rest 17 of the body by flexible means including rubber cushions, such as 14, 15 and 16. These cushions may be disposed above the axes $m$—$m$ as shown in Fig. 1.

Suitable springs, such as helical springs 18, are interposed between the body 17 and the wheel-carrying arms 11a and 11b to transfer the weight of the body to the wheels. Where the wheels are driven, shafts 19 attached thereto may extend coaxially into the transmission housing 12 for connection with a suitable gearing therein not shown.

As shown in Fig. 2, each of the arms 11a, 11b may be formed by a pair of converging rods connected by transverse members, such as 11c, and the helical springs 18 may be disposed laterally of the driving shafts 19. The hinge 13b is disposed in front of arm 11a and the hinge 13a is disposed in the rear of arm 11b. Alternatively, the arms 11a and 11b may be in the form of wishbone links diverging towards the central plane L—L, the diverging ends being mounted in nested relationship, as described later in greater detail with reference to Fig. 7.

In the other embodiments the corresponding parts are designated by similar reference numerals differing from those of Fig. 1 by the addition of 100, 200 etc.

The embodiment illustrated in Fig. 3 differs from that shown in Figs. 1 and 2 primarily by the body including a pair of separate depending supports 124a and 124b each disposed between one of the wheels 110a and 110b and the central vertical longitudinal plane L—L of the body. Each of the wheel carriers 120 is pivotally connected by its arm 111a, or 111b respectively, to the remote one of the supports 124a and 124b. In this manner, the distance between each hinge and its associated wheel is considerably increased over that shown in Fig. 1.

Moreover, the embodiment shown in Fig. 3 differs from that of Fig. 1 by the construction of the arms. Whereas in Fig. 1 the arms 11a and 11b are spaced from the axis m—m throughout their lengths, each of the arms 111a and 111b consists of a tubualr outer portion surrounding the axis m—m and the wheel-driving shaft disposed coaxially thereto and of a downwardly and inwardly projecting arm 122a, or 122b respectively, extending to the associated hinge 113a, or 113b respectively. Here again the hinge 113a about which wheel carrier 120 is swingably guided by arm 111a, 122a is disposed between the opposite wheel 110b and the plane L—L and is located at a considerable distance below the axis m—m of its associated wheel.

Driving shafts 119 fixed to the wheels 110a, 110b extend therefrom coaxially through the tubes 111a and 111b into a transmission housing 112 which is suitably mounted on the body 117. Fexible cuffs 123 may be disposed between the tubes 111a and 111b and the housing 112.

Figure 4:
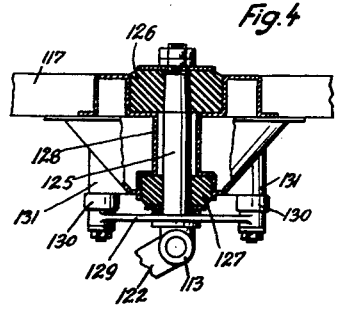
Fig. 4 illustrates the flexible attachment of a supporting part to the body.

If desired, each of the depending supports carrying the hinges at their lower ends may be flexibly connected with the body. That may be accomplished in the manner shown in Fig. 4 in which the hinge 113 on which arm 122 is pivotally mounted is fixed to the lower end of a vertical bolt 125 which extends through a pair of annular rubber cushions 126 and 127. The upper rubber cushion is seated in a suitable depression provided in a body member 117, whereas the lower cushion is seated in a conical sheet metal member 128 which is welded or otherwise secured to the bottom of member 117. Means may be provided to secure the bolt 125 from rotation about its axis. For that purpose, the bolt 125 may be provided with a pair of arms 129 and the ends of these arms may be secured to projections 131 of the body portion 128, rubber cushions 130 being interposed therebetween.

Figure 5:
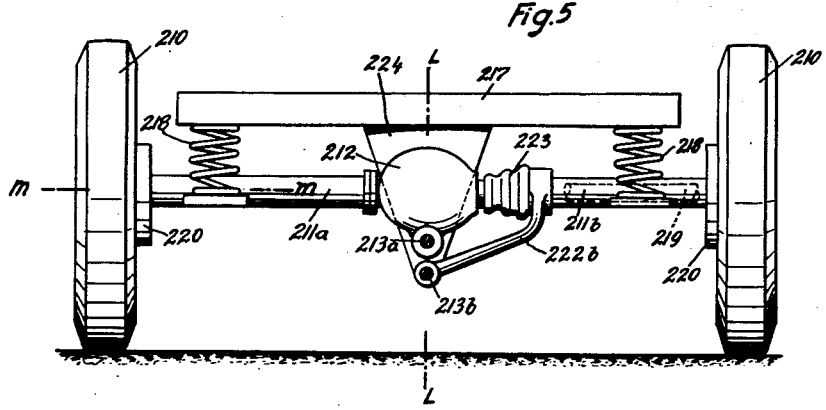
Fig. 5 is a view similar to that of Fig. 1 of another wheel suspension.

The embodiment illustrated in Fig. 5 comprises a body 217 including a depending support 224, a pair of opposite wheels 210 rotatably supported by wheel carriers 220, and tubes 211a and 211b each rigidly secured to one of the wheel carriers 220 in coaxial relationship thereto. A transmission housing 212 is rigidly connected with the tube 211a. A downwardly extending arm 222b is rigidly connected to the other tube 211b. A first hinge 213a serves to pivotally connect the housing 212 to the support 224 and a second hinge 213b pivotally connects the arm 222b to the support 224. The first hinge 213a is disposed at a higher level than the second hinge 213b, but beneath the axes m—m of the wheels 210. Preferably, the first hinge 213a and the second hinge 213b are disposed in the central longitudinal vertical plane L—L of the body. Helical springs 218 are inserted between the body 217 and lateral projections of the respective tubes 211a, 211b. On the right hand side of the transmission housing 212 an aperture is provided and connected by a flexible cuff 223 with the inner open end of tube 211b permitting the passage therethrough of a driving shaft 219 rigidly connected to wheel 210.

Whereas in the embodiment shown in Figs. 1 and 3 the arms of the wheel carriers cross each other, such crossing is avoided in the embodiment shown in Fig. 5.

The embodiment shown in Fig. 5 may be so modified as shown in Fig. 11 that the hinge 213b is disposed at 213b' and that the hinge 213a is disposed at 213a' in order to increase the effective length of the arms 211a and 211b of the wheel carriers.

Figure 6:
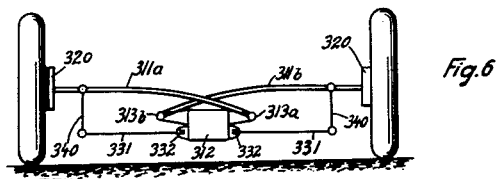
Fig. 6 is a diagrammatic rear view of another embodiment of the present invention.

In the suspension illustrated in Fig. 6 the rear axle transmission 312 or another suitable supporting part of the body is mounted on the body not shown so as to be disposed beneath the axes of the wheels. The arms 311a and 311b rigidly secured to the wheel carriers 320 cross each other above the housing 312 and are pivotally connected to lateral projections of the transmission 312 by hinges 313a and 313b. For the helical springs 18, 118 and 218 shown in the embodiments described hereinbefore torsional spring rods 332 are substituted which extend fore and aft having one end fixed to the body and the other end rotatably journalled in bearings laterally fixed to the housing 312. Arms 331 are secured to the torsional rods near such bearings and the ends of such arms 331 are connected to the arms 311a and 311b by suitable links 340.

Figure 7:
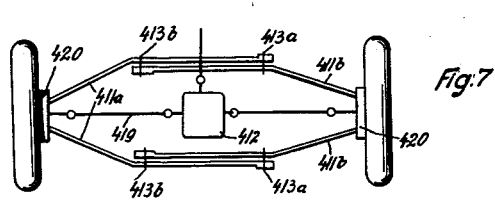
Figs. 7 and 8 are plan views of two further embodiments of the invention, the body itself being omitted.

In the embodiment shown in Fig. 7 a suspension is illustrated in which each of the arms secured to the wheel carriers 420 has the shape of a wishbone link or a bifurcated member 411a, or 411b respectively, the diverging ends of such arms being arranged in nested relationship. The ends of arm 411a are pivotally connected to a supporting part of the body by a pair of coaxial hinges 413a and the ends of arm 411b are pivotally connected to a supporting part of the body by a pair of coaxial hinges 413b. Here again the supporting part of the body may be flexibly mounted on the rest of the body by the interposition of rubber cushions or the like.

Figure 8:
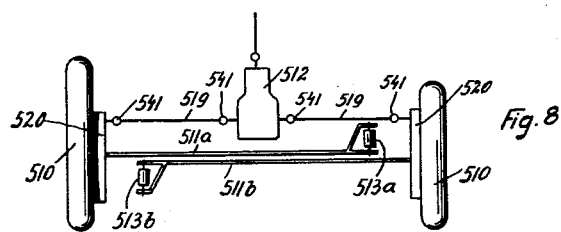

In the embodiment shown in Fig. 8 the axle housing 512 is lengthwise offset relative to the axes of the wheels 510. Shafts 519 provided with universal joints 541 extend from the housing 512 into the respective wheel carriers 520 which constitute suitable housings for a gearing including a pinion secured to the outer ends of shaft 519 and gears meshing therewith and secured to the wheels 510. The arms 511a and 511b rigidly secured to the wheel carriers 520 extend behind the transmission casing 512 beyond the central intermediate vertical plane of the vehicle and terminate in hinges 513a, or 513b respectively, whereby they are pivotally connected to supporting parts of the body. As will appear from Fig. 8, the arms 511a and 511b are offset lengthwise to each other. In this design, each of the arms 511a and 511b may be perfectly straight and need not be curved beneath the transmission housing or beneath the arm of the other wheel carrier.

Figure 9:
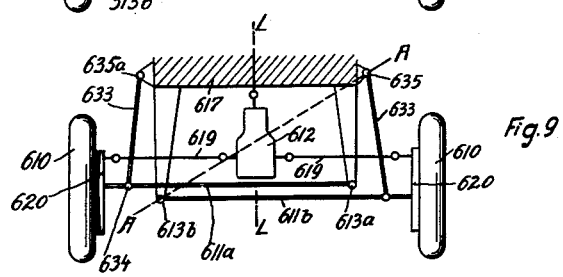
Figs. 9 and 10 are plan views of two additional embodiments of the present invention, same being daigrammatically illustrated.

The suspension illustrated in Fig. 9 comprises a body 617, a pair of opposite wheels 610 rotatably supported by wheel carriers 620, and bifuracted struts which are rigidly secured to the wheel carriers 620 and are pivotally connected to the body. Each strut has one limb 611a, or 611b respectively, extending transversely to the body beyond the central longitudinal plane L—L thereof up to a point 613a, or 613b respectively, and has another limb 633 which extends substantially fore and aft of the body up to a point 635a, or 635b respectively. The ends of both limbs are pivotally connected to suitable supporting parts of the body by universal joints or the like provided at 613a, 613b, 635a and 635b. As a result, the wheel carrier 620 of the right hand wheel is mounted for oscillation about an axis A—A extending through the points 613b and 635b. Similarly, the wheel carrier 620 of the left hand wheel is mounted for oscillation about an axis extending through the points 613a and 635a.

The transmission housing 612 is suitably secured to the body and the gearing included therein is connected with pinions driving the wheels 610 by driving shafts 619 in which universal joints are inserted. The supporting parts of the body carrying the hinges at 613a, 613b, 635a and 635b may be connected to the rest of the body in a flexible manner by the interposition of rubber cushions as described hereinabove. Similarly, rubber elements may be inserted in the joints provided at 613a, 613b and 635a, 635b.

Figure 10:
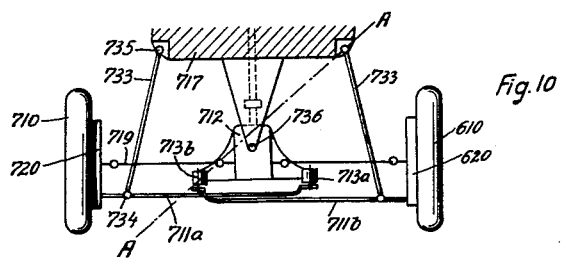

The embodiment shown in Fig. 10 is similar to that shown in Fig. 9 except that the supporting parts carrying the joints 713a and 713b are integral with the transmission housing 712 and that the latter is flexibly connected with the body 717 through a suitable projection thereof and by means of rubber cushions.

Preferably, such rubber cushions permit a limited oscillation of the housing 712 about a central longitudinal axis of the vehicle. The limbs 733 of the struts secured to the wheel carriers 720 will transfer any thrust or traction of the wheels to the body of the vehicle and will thus greatly relieve the hinges 713a and 713b. If desired, the axes of the pivotal connections 713a, 713b and 735 may coincide with the respective axes A—A.

In each of the four embodiments shown in Figs. 7, 8, 9 and 10 the hinges referred to are disposed beneath and spaced from the wheel axes. In each of the embodiments shown in Figs. 8, 9 and 10 the arms rigidly secured to the wheel carriers 520, 620, or 720 respectively, may extend before or behind the vertical plane including the wheel axes.

While the invention has been described in connection with several different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. In a vehicle, the combination comprising a body, a pair of opposite wheel carriers, wheels journalled on said carriers, arms rigidly secured to said wheel carriers, said body including a pair of separate depending supports each disposed between one of said wheels and the central vertical longitudinal plane of said body, each of said wheel carriers being pivotally connected by its arm to the remote one of said supports, hinges constituting the pivotal connection between said arms and said supports, and elastic cushion means disposed above the axes of said wheels a substantial distance and effectively interposed between said supports and said body, the axes of said hinges being disposed below the axes of said wheels.

2. The combination claimed in claim 1 in which said arms are relatively offset lengthwise of said body.

3. In a vehicle, the combination according to claim 1 further comprising helical spring means interposed between said arms and said body, the axes of said hinges extending lengthwise of the vehicle below and spaced from the axes of said wheels.

4. In a vehicle, the combination according to claim 1, wherein each of said supports includes a bolt member, the corresponding hinge being secured to the lower end of said bolt member, and said elastic cushion means being disposed between said bolt member and said body.

5. In a vehicle, the combination according to claim 4, further comprising means operatively connected between said bolt member and said body to prevent rotation of said bolt member about its axis.

6. In a vehicle, the combination comprising a pair of opposite wheel carriers, wheels journaled on said wheel carriers, a body, supporting means, means for flexibly connecting said supporting means to said body including rubber cushions disposed above the axes of said wheels a substantial distance, arms rigidly secured to said wheel carriers and relatively offset lengthwise of said body, each arm extending from its wheel carrier beyond the vertical central longitudinal plane of said body, hinges pivotally connecting the ends of said arms to said supporting means, the axes of said hinges being disposed beneath and spaced from the axes of said wheel carriers, and extending lengthwise of the vehicle, and helical springs inserted between said body and said arms.

References Cited in the file of this patent

UNITED STATES PATENTS

| | | |
|---|---|---|
| 1,650,544 | Sizaire | Nov. 22, 1927 |
| 2,053,869 | Haltenberger | Sept. 8, 1936 |
| 2,055,975 | Haltenberger | Sept. 29, 1936 |
| 2,145,670 | Tjaarda | Jan. 31, 1939 |
| 2,352,053 | Wilfert | June 20, 1944 |
| 2,369,501 | Wagner | Feb. 13, 1945 |